United States Patent
Weilant et al.

[11] Patent Number: 5,386,898
[45] Date of Patent: Feb. 7, 1995

[54] VACUUM ACTUATED AXLE DISCONNECT

[75] Inventors: David R. Weilant; Jack F. Engle, both of Muncie, Ind.

[73] Assignee: Borg-Warner Automotive, Inc., Sterling Heights, Mich.

[21] Appl. No.: 147,615

[22] Filed: Nov. 5, 1993

[51] Int. Cl.⁶ ............... B60K 17/354; F16D 11/14; F16D 25/061
[52] U.S. Cl. ............ 192/67 R; 192/85 V; 475/86; 475/223; 180/247
[58] Field of Search ............ 192/67 R, 85 A, 85 V, 192/91 A; 475/86, 223, 234; 180/247, 248; 137/398

[56] References Cited

U.S. PATENT DOCUMENTS

| | | | |
|---|---|---|---|
| 3,973,450 | 8/1976 | Shealy | 475/86 |
| 4,167,881 | 9/1979 | Bell et al. | 475/86 X |
| 4,595,087 | 6/1986 | Morisawa et al. | 192/67 R |
| 4,627,512 | 12/1986 | Clohessy | 180/247 |
| 5,105,900 | 4/1992 | Adler et al. | 180/247 |
| 5,105,902 | 4/1992 | Wilson et al. | 180/247 |
| 5,123,513 | 6/1992 | Petrak | 192/85 CA |

FOREIGN PATENT DOCUMENTS

| | | | |
|---|---|---|---|
| 2-133237 | 5/1990 | Japan | 180/247 |
| 2-292563 | 12/1990 | Japan | 192/67 R |
| 1429492 | 3/1976 | United Kingdom | 475/86 |

*Primary Examiner*—Richard M. Lorence
*Attorney, Agent, or Firm*—Reising, Ethington, Greg Dziegielewski

[57] ABSTRACT

A part time four wheel drive vehicle has an axle disconnect in its auxiliary drive axle. The axle disconnect has a clutch sleeve non-rotatably and translatably mounted on an inner axle shaft so that the clutch sleeve translates between a first position where clutch teeth of the clutch sleeve engage clutch teeth of an outer axle shaft and a second position where the clutch teeth disengage. The clutch sleeve includes an integral annular piston that is part of a coaxial motor that shifts the clutch sleeve from one position to the other in conjunction with a return spring. The vacuum motor communicates with an external vacuum source and the axle disconnect includes a float valve for sealing a vacuum port of the vacuum motor to protect the external vacuum source against contamination if the vacuum motor is filled with lubricant in the axle housing leaking into the vacuum motor housing.

14 Claims, 2 Drawing Sheets

VACUUM ACTUATED AXLE DISCONNECT

BACKGROUND OF THE INVENTION

This invention relates generally to axle disconnects for part-time four wheel drive vehicles and more particularly to vacuum operated axle disconnects.

U.S. Pat. No. 5,105,900 granted to Randy W. Adler and David Sperduti Apr. 21, 1992 discloses a part time four wheel drive vehicle that includes an axle disconnect mechanism in a front axle assembly. The axle disconnect mechanism includes a vacuum motor and a shift fork assembly. The vacuum motor communicates with a vacuum source (not shown) that is controlled by a two position solenoid valve. The fork shift assembly under control of the vacuum motor controls the axial shifting of a clutch collar between positions corresponding to coupled and uncoupled operating modes.

U.S. Pat. No. 5,102,902 granted to Robert J. Wilson and Randolph C. Williams Apr. 21, 1992 discloses the same axle disconnect mechanism.

The two systems have the common drawback of an externally mounted vacuum motor that requires considerable extra space particularly when vehicle suspension travel is taken into account. The use of an externally mounted vacuum motor also necessitates the use of a fork shift assembly which adds to the cost and complexity of the prior art arrangement exemplified by these two patents.

U.S. Pat. No. 5,123,513 granted to Harry A. Petrak Jun. 23, 1992 also discloses a part time four wheel drive vehicle that includes an axle disconnect in the front axle assembly. This axle disconnect is operated by a power shift mechanism. The power shift mechanism includes sealed envelopes in the form of expandable and contractible compartments that shift the axle disconnect into and out of engagement in response to a remote control valve. The sealed envelopes are located in the axle housing encircling a shiftable drive gear as shown in FIG. 7 of the patent. The shiftable drive gear couples and uncouples inner and outer drive shafts.

This arrangement does not require the extra space and fork shift assembly of the previous arrangement. However, this arrangement requires two sealed envelopes and several other parts operatively connecting the sealed envelopes with the shiftable drive gear. Consequently this arrangement is also complex and expensive to produce particularly when the difficulty of assembly is taken into account.

SUMMARY OF THE INVENTION

The object of this invention is to provide an axle disconnect that is simple in design, compact in construction and economical to manufacture.

A feature of the invention is that the axle disconnect of the invention has a fluid motor and a shiftable clutch sleeve that are coaxially arranged to save space.

Another feature of the invention is that the axle disconnect of the invention has a coaxially arranged shiftable clutch sleeve and fluid motor in which the piston of the fluid motor is provided by an integral flange of the clutch sleeve so that the axle disconnect is easier to assemble and less expensive to manufacture.

Still yet another feature of the invention is that the axle disconnect of the invention has a vacuum motor that is equipped with a float valve to prevent contamination of an external vacuum source if the vacuum motor is filled with lubricant in the axle housing leaking into the vacuum motor.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
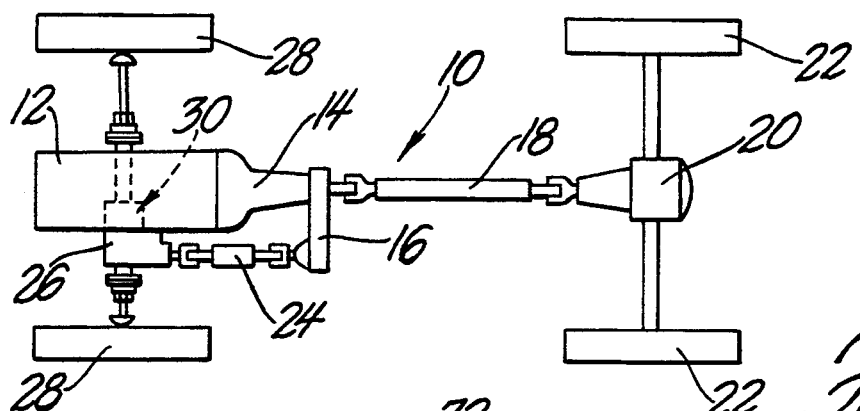
FIG. 1 is a schematic plan view of a part time four wheel drive vehicle.

Referring now to the drawings and more particularly to FIG. 1, there is shown a schematic plan view of a part time four wheel drive vehicle 10 comprising engine 12, transmission 14 and transfer case 16 mounted on a vehicle chassis (not shown). The engine 12 and transmission 14 are conventional and well known components as is the transfer case 16 which typically includes an input shaft, a main output shaft and an auxiliary output shaft. The main output shaft is drive connected to the input shaft by a clutch or the like in the transfer case 16 and customarily offset from it. The clutch is actuated by a suitable selector mechanism controlled by the vehicle driver. The internal details of the transfer case 16 and details of a selector mechanism are not shown because these are conventional and well known components.

The main output shaft is drivingly connected to a rear propeller shaft 18 which in turn is drivingly connected to a rear differential of a rear drive axle 20 that drives rear wheels 22 in a well known manner.

The auxiliary output shaft is drivingly connected to a front propeller shaft 24 which in turn is drivingly connected to a front differential of a front drive axle 26 for selectively driving front wheels 28.

This invention relates to an auxiliary drive axle, such as the front drive axle 26 and more particularly to a axle disconnect for such a drive axle that is generally indicated at 30.

Figure 2:
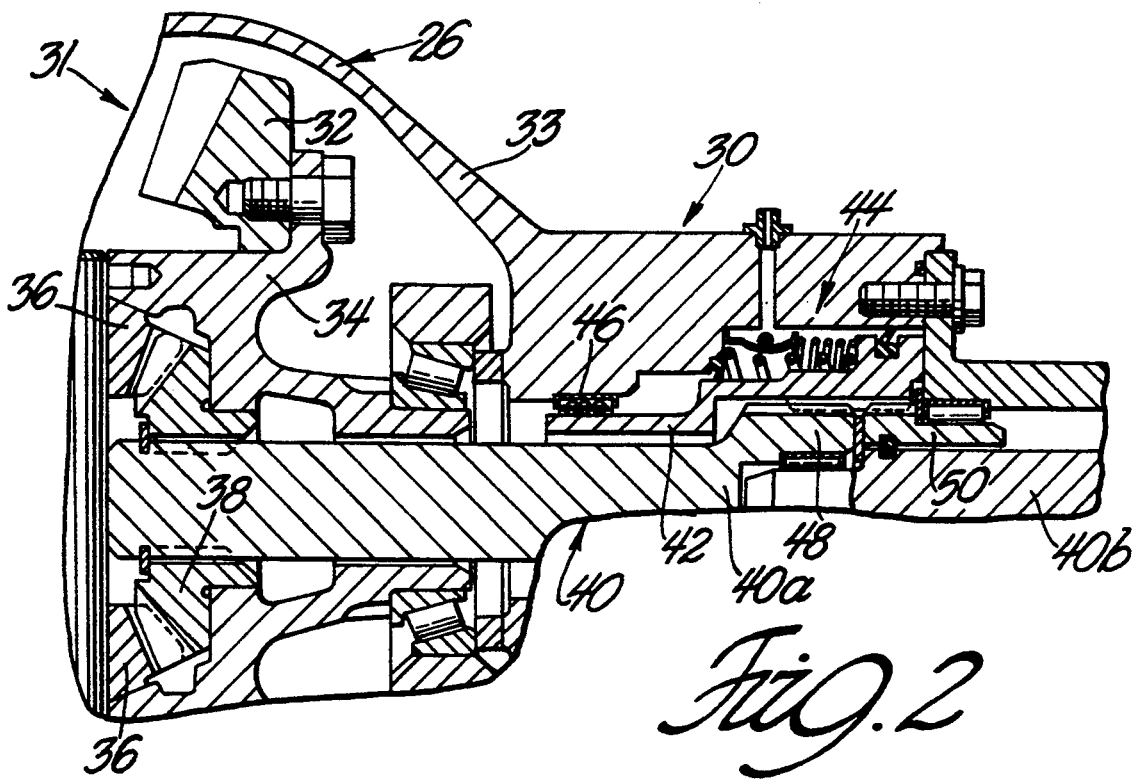
FIG. 2 is fragmentary sectional view of the front drive axle of the vehicle that is shown in FIG 1.

Referring now to FIG. 2, the differential 31 of the front drive axle 26 is a conventional automotive type bevel gear differential comprising a ring gear 32 that is driven by a pinion gear (not shown) attached to the propeller shaft 24 shown in FIG. 1. The ring gear 32 drives a case 34 that is rotatably mounted in the axle housing 33. Two pinion gears 36 and two side gears 38 (one shown) are inside case 34. The pinion gears 36 are journalled or rotatably mounted on a cross pin carried by the case 34 and mesh with each of the side gears 38. The side gears 38 are drive connected to the ends of respective drive shafts 40 for driving front wheels 28. One drive shaft 40, in this instance, the right drive shaft is split into an inner drive shaft 40a and an outer drive shaft 40b that operate in conjunction with the axle disconnect 30.

The axle disconnect 30 comprises a clutch sleeve 42 and shift means indicated generally at 44 for shifting the clutch sleeve 42 back and forth between a first position and a second position. In the first or engage position the clutch sleeve 42 couples the inner and outer axle shafts 40a and 40b for transmitting torque as shown in FIGS.

2 and 3. In the second or disengage position, the clutch sleeve 42 is translated to the left of the position shown in FIGS. 2 and 3 so that it is decoupled from the outer shaft 40b and neither axle shaft can transmit torque to the other.

Figure 3:
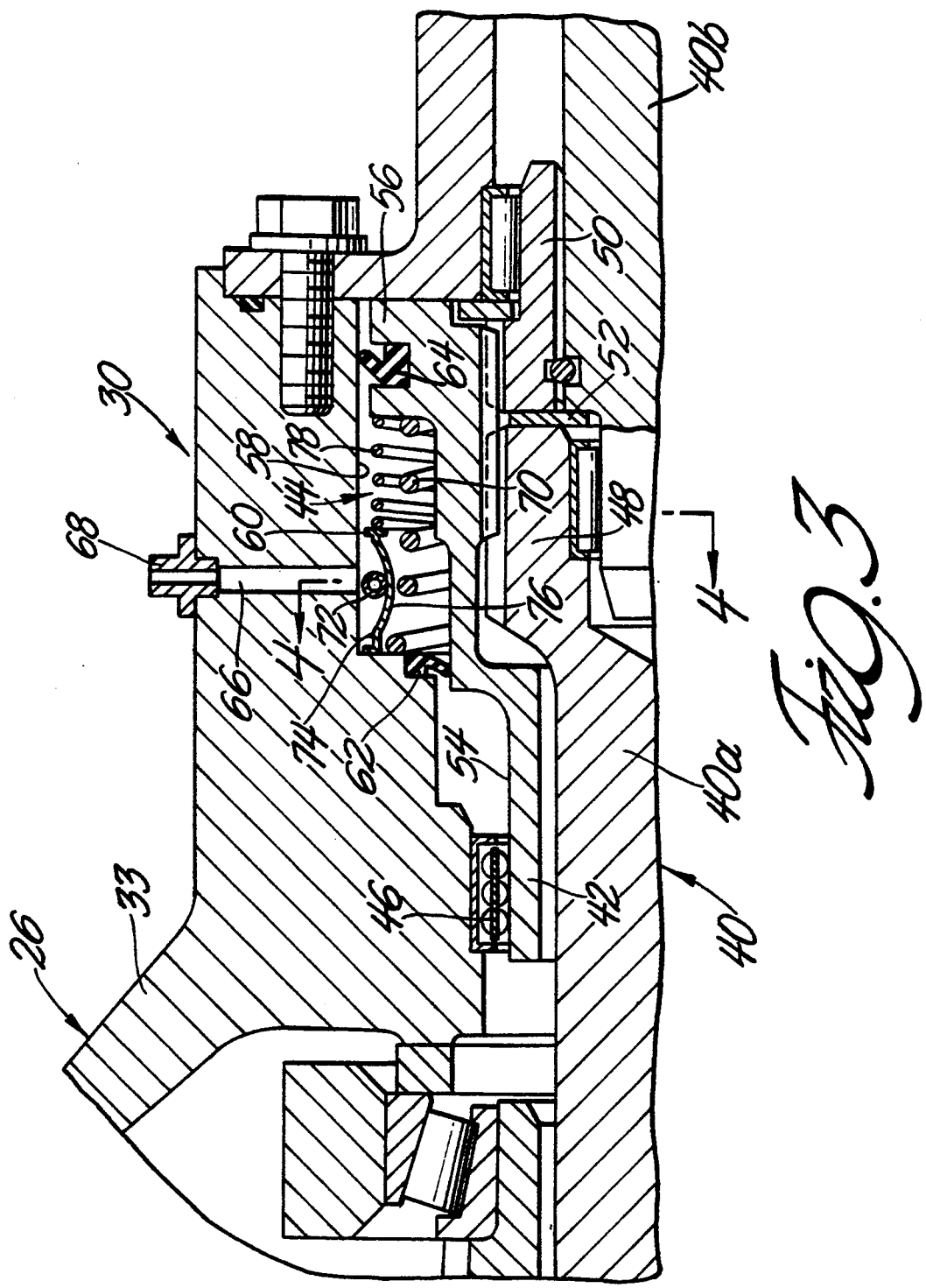
FIG. 3 is an enlargement of a portion of FIG. 2.

The clutch sleeve 42 is stepped longitudinally as best shown in FIG. 3. The smaller end serves as an inner race for a ball sleeve bearing 46 that supports the clutch sleeve 42 for translation as well as rotation in the axle housing 33. The larger end of the clutch sleeve 42 has internal splines or teeth that slide on mating external teeth of an enlarged hollow end 48 of the inner axle shaft 40a.

The inner and outer axle shafts 40a and 40b are coaxially arranged end-to-end. The outer axle shaft 40b has an integral end trunnion that is supported on a cylindrical roller bearing pressed into the hollow end 48 of the inner axle shaft 40a. A collar 50 is nonrotatably attached to the end of the outer axle shaft 40b. It cooperates with a cylindrical roller bearing mounted in the axle housing 33 to rotatably support the end of axle shaft 40b. The collar 50 also has external splines or teeth that match the internal teeth of the clutch sleeve 42 so that the teeth interengage when the clutch sleeve 42 is in the engaged position shown in FIGS. 2 and 3 so as to transmit torque from one axle shaft to the other via the clutch sleeve 42. The external teeth of the collar 50 disengage from the internal teeth of the clutch sleeve 42 when it is shifted to the left from the position shown in FIGS. 2 and 3. The axle shafts 40a and 40b can rotate relative to each other when the shift sleeve 42 is in this disengage position. Consequently, a thrust washer 52 is provided between the adjacent ends of the axle shafts 40a and 40b.

The larger end of the shift sleeve 42 has an external sealing surface 54, an intermediate spring pilot surface and an integral flange at the outboard end that forms an annular piston 56.

As indicated earlier, the axle disconnect 30 has shift means 44 for shifting the clutch sleeve 42 from the first position to the second position and vice-versa. The shift means 44 comprises the integral annular piston 56 which is coaxially arranged with respect to the inner and outer axle shafts 40a and 40b. The piston is slidably disposed in a cylinder 58 of the axle housing 33 so as to form a fluid motor 60 that contracts and expands to shift the clutch sleeve 42 from one position to the other. The fluid motor 60 is preferably a vacuum motor and as such is sealed from the remaining interior of the axle housing 33 which is customarily filled with lubricant. End seal 62 is mounted in a circular groove in the axle housing 33 with its seal lip in sealing engagement with the sealing surface 54 of the clutch sleeve 42 to seal one end of the vacuum motor 60. End seal 64 is mounted in a circular groove in the piston 56 with its sealing lip in sealing engagement with the side wall of the cylinder 58 to seal the other end.

The vacuum motor 60 communicates with an external vacuum source via port 66 which has an external fitting 68 for connecting the vacuum motor 60 to an suitable external vacuum source such as the engine manifold through a control valve (not shown).

The shift means 44 further includes a return spring 70 that is disposed in the vacuum motor 60 between an end wall of the cylinder 58 and the annular piston 56. The spring 70 is located radially in the vacuum chamber 60 by the intermediate spring pilot surface of the clutch sleeve 42. The return spring 70 biases the clutch sleeve 42 to the first or engage position as shown in FIGS. 2 and 3. The clutch sleeve 42 is disengaged by shifting the clutch sleeve 42 to the left until the internal teeth are out of driving contact with the external teeth of the collar 50. This shift is accomplished by evacuating vacuum motor 60.

The axle disconnect 30 has a spring engagement and a vacuum disengagement. However, the axle disconnect can be modified for a vacuum engagement and a spring disengagement by relocating the flange of the shift sleeve 42 so that the vacuum motor 60 is on the opposite side of the piston 56.

As indicated earlier, the vacuum motor 60 is sealed from the remaining interior of the axle housing 33 which is customarily filled with lubricant. The axle disconnect 30 is equipped with a float valve arrangement to protect the external components of the vacuum supply system against contamination in the event that lubricant leaks into the vacuum motor 60 past the seals 62 and 64.

Figure 4:
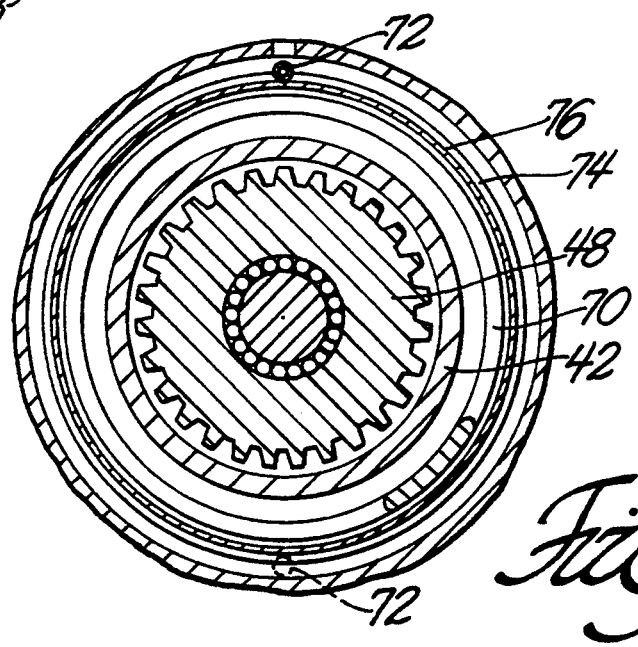
FIG. 4 is a view taken substantially along the line 4—4 of FIG. 3 looking in the direction of the arrows.

The float valve arrangement comprises a float valve for sealing the vacuum port 66 when the vacuum motor 60 is filled with lubricant. The float valve comprises a ball float 72 and a centering device for aligning the ball float 72 with an inlet of the vacuum port 66. The centering device includes a ring 74 having an annular concave track 76 for the ball float 72 and a spring 78 that holds the ring 74 against the end wall of the cylinder 58 so that the concave track 76 is properly positioned for aligning the ball float 72 with the inlet of the vacuum port 66. The ball float 72 is normally positioned in the bottom of the cylinder 58 as shown in phantom in FIG. 4. However as the vacuum chamber 60 fills with leakage lubricant the ball float 72 travels around the track 76 with the rising level of lubricant in the vacuum chamber 60 and eventually rises to the top where it is properly positioned by the track 76 for sealing the inlet of the port 66 as shown in FIGS. 3 and 4. The ball float 72 is made of any suitable material that floats in lubricants customarily used in axles; that is compatible with such lubricant and that has some elastomeric like qualities so as to seal off the inlet of the port 66 when it is seated against the inlet.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An axle disconnect comprising:
    an axle housing rotatably supporting an inner axle shaft and a coaxial outer axle shaft,
    a clutch sleeve non-rotatably and translatably mounted on one of the inner and outer axle shafts so that the clutch sleeve translates between a first position where clutch teeth of the clutch sleeve engage clutch teeth of the other of the inner and outer axle shafts and a second position where the clutch teeth disengage, and
    shift means for shifting the clutch sleeve from the first position to the second position and vice-versa,
    the shift means comprising a piston that is an integral part of the clutch sleeve and slidably disposed in a cylinder of the axle housing so as to form an expandable and contractible vacuum motor,
a return spring disposed in the vacuum motor biasing the clutch sleeve to one of the first and second positions, and
the clutch sleeve being shifted to the other of the first and second positions against the bias of the return spring when the vacuum motor is evacuated.

2. The axle disconnect as defined in claim 1 wherein the return spring engages an end wall of the cylinder and the piston is an integral annular flange of the clutch sleeve that is pushed against an opposite end wall of the cylinder when the return spring biases the clutch sleeve to the one position.

3. An axle disconnect comprising:
an axle housing rotatably supporting an inner axle shaft and a coaxial outer axle shaft,
a clutch sleeve non-rotatably and translatably mounted on one of the inner and outer axle shafts so that the clutch sleeve translates between a first position where clutch teeth of the clutch sleeve engage clutch teeth of the other of the inner and outer axle shafts and a second position where the clutch teeth disengage, and
shift means for shifting the clutch sleeve from the first position to the second position and vice-versa,
the shift means comprising a piston that is coaxially arranged with respect to the inner and outer axle shafts and slidably disposed in a cylinder of the axle housing so as to form an expandable and contractible vacuum motor,
a return spring disposed in the axle housing and biasing the clutch sleeve to one of the first and second positions, the clutch sleeve being shifted to the other of the first and second positions against the bias of the return spring when the vacuum motor is evacuated, and
a float valve for sealing a vacuum port of the vacuum motor when the vacuum motor is filled with lubricant.

4. The axle disconnect as defined in claim 3 wherein the float valve comprises a ball float and a centering device for aligning the ball float with an inlet of the vacuum port.

5. The axle disconnects defined in claim 4 wherein the centering device includes a ring having an annular concave track for the ball float and a spring positioning the ring so that the concave track is aligned with the inlet of the vacuum port.

6. The axle disconnect as defined in claim 5 wherein the return spring is disposed in the vacuum motor inwardly of the ring of the centering device.

7. An axle disconnect for an auxiliary drive axle having a differential comprising:
an axle housing rotatably supporting an inner axle shaft and a coaxial outer axle shaft end-to end,
the axle shafts having external clutch teeth at adjacent ends,
a clutch sleeve rotatably and translatably disposed in the axle housing and coaxially arranged with respect to the inner and outer axle shafts,
the clutch sleeve having internal clutch teeth slidably engaging the external clutch teeth of one of the inner and outer axle shafts so that the clutch sleeve translates between a first position where the internal teeth engage the external teeth of the other of the inner and outer axle shafts and a second position where the internal teeth disengage the external teeth of the other of the inner and outer axle shafts, and
shift means for shifting the clutch sleeve from the first position to the second position and vice-versa,
the shift means comprising an integral annular flange of the clutch sleeve that provides a piston that is slidably disposed in a cylinder of the axle housing so as to form a vacuum motor, that is coaxially arranged with respect to the inner and outer axle shafts,
the axle housing having a vacuum port communicating with the vacuum motor for connecting the vacuum motor to an external vacuum source,
a return spring disposed in the vacuum motor and biasing the clutch sleeve to one of the first and second positions, and
the clutch sleeve being translated to the other of the first and second positions against the bias of the return spring when the vacuum motor is evacuated.

8. An axle disconnect for an auxiliary drive axle having a differential comprising:
an axle housing rotatably supporting an inner axle shaft and a coaxial outer axle shaft end-to end,
the axle shafts having external clutch teeth at adjacent ends,
a clutch sleeve rotatably and translatably disposed in the axle housing and coaxially arranged with respect to the inner and outer axle shafts,
the clutch sleeve having internal clutch teeth Slidably engaging the external clutch teeth of one of the inner and outer axle shafts so that the clutch sleeve translates between a first position where the internal teeth engage the external teeth of the other of the inner and outer axle shafts and a second position where the internal teeth disengage the external teeth of the other of the inner and outer axle shafts, and
shift means for shifting the clutch sleeve from the first position to the second position and vice-versa,
the shift means comprising an integral annular flange of the clutch sleeve that provides a piston that is slidably disposed in a cylinder of the axle housing so as to form a vacuum motor, that is coaxially arranged with respect to the inner and outer axle shafts,
the axle housing having a vacuum port communicating with the vacuum motor fop connecting the vacuum motor to an external vacuum source,
a return spring disposed in the vacuum motor and biasing the clutch sleeve to one of the first and second positions,
the clutch sleeve being translated to the other of the first and second positions against the bias of the return spring when the vacuum motor is evacuated, and
a float valve for sealing the vacuum port when the vacuum motor is filled with lubricant.

9. The axle disconnect as defined in claim 8 wherein the float valve comprises a ball float and a centering device for aligning the ball float with an inlet of the vacuum port.

10. The axle disconnect defined in claim 9 wherein the centering device includes a ring having an annular concave track for the ball float and a spring positioning the ring so that the concave track is aligned with the inlet of the vacuum port.

11. The axle disconnect as defined in claim 10 wherein the return spring is disposed in the vacuum motor inwardly of the ring of the centering device.

12. An axle disconnect comprising:
an axle housing rotatably supporting an inner axle shaft and a coaxial outer axle shaft,
a clutch sleeve non-rotatably and translatably mounted on one of the inner and outer axle shafts so that the clutch sleeve translates between a first position where clutch teeth of the clutch sleeve engage clutch teeth of the other of the inner and outer axle shafts and a second position where the clutch teeth disengage, and
shift means for shifting the clutch sleeve from the first position to the second position and vice-versa,
the shift means comprising a piston that is coaxially arranged with respect to the inner and outer axle shafts and slidably disposed in a cylinder of the axle housing so as to form an expandable and contractible vacuum motor, and
a float valve disposed in the vacuum motor for sealing a vacuum port of the vacuum motor when the vacuum motor is filled with lubricant.

13. The axle disconnect as defined in claim 12 wherein the float valve comprises a ball float and a centering device for aligning the ball float with an inlet of the vacuum port.

14. The axle disconnects defined in claim 13 wherein the centering device includes a ring having an annular concave track for the ball float and a spring positioning the ring so that the concave track is aligned with the inlet of the vacuum port.

* * * * *